(12) United States Patent
Brodie et al.

(10) Patent No.: US 8,176,019 B2
(45) Date of Patent: May 8, 2012

(54) EXTENDING THE SPARCLE PRIVACY POLICY WORKBENCH METHODS TO OTHER POLICY DOMAINS

(75) Inventors: Carolyn A. Brodie, Briarcliff, NY (US); Clare-Marie Karat, Greenwich, CT (US); John Karat, Greenwich, CT (US); Peter K. Malkin, Ardsley, NY (US)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 12/062,218

(22) Filed: Apr. 3, 2008

(65) Prior Publication Data

US 2008/0189761 A1 Aug. 7, 2008

Related U.S. Application Data

(63) Continuation of application No. 11/503,698, filed on Aug. 14, 2006, now abandoned.

(51) Int. Cl.
G06F 7/00 (2006.01)
G06F 17/00 (2006.01)
G06F 7/04 (2006.01)
G06F 15/16 (2006.01)
G06F 17/30 (2006.01)
H04L 29/06 (2006.01)

(52) U.S. Cl. .............................. 707/694; 726/1; 726/6

(58) Field of Classification Search ....... 726/6; 707/694
See application file for complete search history.

(56) References Cited

U.S. PATENT DOCUMENTS 7,231,668 B2 * 6/2007 Jacobson ..................... 726/26
2002/0178380 A1 * 11/2002 Wolf et al. .................... 713/201

OTHER PUBLICATIONS

John Karat et al., Privacy Information Technology: Designing to Enable Privacy Policy Management in Organizations, International Journal of Human-Computer Studies, Jul. 2005, pp. 153-174, vol. 63, Issue 1-2.
James B. Michael et al., Natural-Language Processing Support for Developing Policy-Governed Software Systems, 39th International Conference on Technology for Object-Oriented Language and System, IEEE Computer Society Press, Jul. 2001, pp. 263-274.
Carolyn Brodie et al., Usable Security and Privacy: A Case Study of Developing Privacy Management Tools, Proceedings of the 2005 Symposium on Usable Privacy and Security (SOUPS), Jul. 6-8, 2005, pp. 35-43, Pittsburgh, PA.

* cited by examiner

*Primary Examiner* — Angela Lie
*Assistant Examiner* — Kris Mackes
(74) *Attorney, Agent, or Firm* — Scully, Scott, Murphy & Presser, P.C.; Anne V. Dougherty, Esq.

(57) ABSTRACT

A method and system enable a user to develop domain-specific policy workbench. Domains may include, but are not limited to security, autonomic computing, workload management and systems management. The method and system in one aspect determines syntax of a policy in a selected domain and creates an instance of policy workbench specific to the selected domain. In one aspect, the instance of policy workbench includes at least machine-readable encodings of the selected policy and associated mapping. The instance of policy workbench also includes a compliance auditing tool enabled to check events logged at a target system against the selected policy and associated mapping to determine if one or more policy rules have been complied with. In another aspect, domain-specific policy workbench creation machine is provided that automatically creates an instance of domain-specific policy workbench.

15 Claims, 5 Drawing Sheets

EXTENDING THE SPARCLE PRIVACY POLICY WORKBENCH METHODS TO OTHER POLICY DOMAINS

RELATED APPLICATIONS

This application is a continuation of U.S. patent application Ser. No. 11/503,698, filed Aug. 14, 2006.

FIELD OF THE INVENTION

The present disclosure generally relates to policy management and implementation.

BACKGROUND OF THE INVENTION

Both organizations and individuals use some form of policies to regulate their behavior and use of various resources. Using IT access control systems, for example, a school or company can restrict the access and use of data on their computers. The drawback with this approach is that is does not provide any sort of high level description, rather everything is handled by the computer's low-level access control system (e.g., IBM zSeries RACF).

Michael, J., Ong, V., and Rowe, N., "Natural-Language Processing Support for Developing Policy-Governed Software Systems" 39th International Conference on Technology for Object-Oriented Languages and Systems, IEEE Computer Society Press, (Santa Barbara, Calif., July 2001), 263-274), describes a method enabling users to enter their desired policy using natural language, which is than converted into first-order predicate logic for use by a computer's access control system. The main problem with this approach is that the translation from natural language to first-order predicate logic can be inaccurate. Thus, a given specified policy may be never actually enforced. Further, no method is provided to verify that the given computer's activity complies with the given policy.

Karat, J., Karat, C., Brodie, C., and Feng, J., "Privacy in Information Technology: Designing to Enable Privacy Policy Management in Organization" (International Journal of Human-Computer Studies, Volume 63, Issue 1-2 (July 2005) pp 153-174) provides a case study of the development of a privacy policy workbench utility. The work describes a workbench providing support for privacy, but not any other domain. More importantly, it does not provide a repeatable method for a person of ordinary skill in the art to develop his or her own policy workbench for a given domain—possibly one other than privacy.

Thus, there remains a need for a method enabling creation of domain-specific policy workbench, for example, that provides an authoring tool to create relevant policies, a mapping tool to enable the implementation of a given policy, and a compliance auditing tool that allows a user to verify that a given system's activity complies with a given policy.

BRIEF SUMMARY OF THE INVENTION

A method and system for creating a policy workbench for a given domain are provided. The method in one aspect comprises analyzing a domain and providing a domain-specific policy workbench. In one aspect, the step of analyzing a domain may include determining syntax of one or more policy rules associated with the domain. In another aspect, the step of determining syntax uses an encoding format as a basis. Yet in another aspect, the step of providing a domain-specific policy workbench may include creating a natural language grammar based on the syntax. Still yet, the domain specific policy workbench may provide an encoded rendering of a given policy. The encoding, for example, is XML-based and the XML-based encoding, for example, may use the OASIS XACML standard. The domain may include, but is not limited to, security, autonomic computing, workload management, or systems management, or combination thereof.

Yet in another aspect, the step of providing the domain-specific policy workbench may further include providing one or more mappings between one or more policy-rule elements and one or more domain elements. Still yet, the method may further include obtaining one or more system activity events from a log, using the one or more mappings to translate the one or more system activity events into policy language, and comparing translated events to policy rules.

A method of creating a domain-specific policy workbench in another aspect may comprise determining syntax of a policy in a selected domain and creating an instance of policy workbench specific to the selected domain. The method may further include determining whether creating a policy for the selected domain is feasible, and if it is determined that creating a policy for the selected domain is feasible, performing the step of creating. In one aspect, the step of creating may include at least invoking an authoring tool creation handler to create an authoring tool operable to allow a practitioner to author a selected policy, invoking a policy and mapping data handler creation handler to create a policy and mapping data handler operable to create a policy workbench instance including at least a machine-readable encodings of the selected policy and associated mapping, and invoking a compliance auditing tool creation handler to create a compliance auditing tool operable to allow a practitioner to audit compliance of system activities according to the selected policy and the associated mapping. The step of creating may further include at least invoking a practitioner identification handler to identify one or more practitioners, and invoking a practitioner skill identification handler to determine skills of the one or more practitioners. The step of creating may further include at least invoking a mapping handler to determine one or more mappings between one or more elements of a target system and the selected policy.

A system for creating a domain-specific policy workbench in one aspect comprises a policy grammar handler operable to determine syntax of a policy in a selected domain. The system also includes a policy and mapping data handler creation handler operable to create a policy and mapping data handler that is operable to create a policy workbench instance including at least a machine-readable encodings of the selected policy and associated mapping, and a compliance auditing tool creation handler operable to create a compliance auditing tool that is operable to allow a practitioner to audit compliance of system activities according to the selected policy and the associated mapping.

Further features as well as the structure and operation of various embodiments are described in detail below with reference to the accompanying drawings. In the drawings, like reference numbers indicate identical or functionally similar elements.

DETAILED DESCRIPTION

Figure 1:
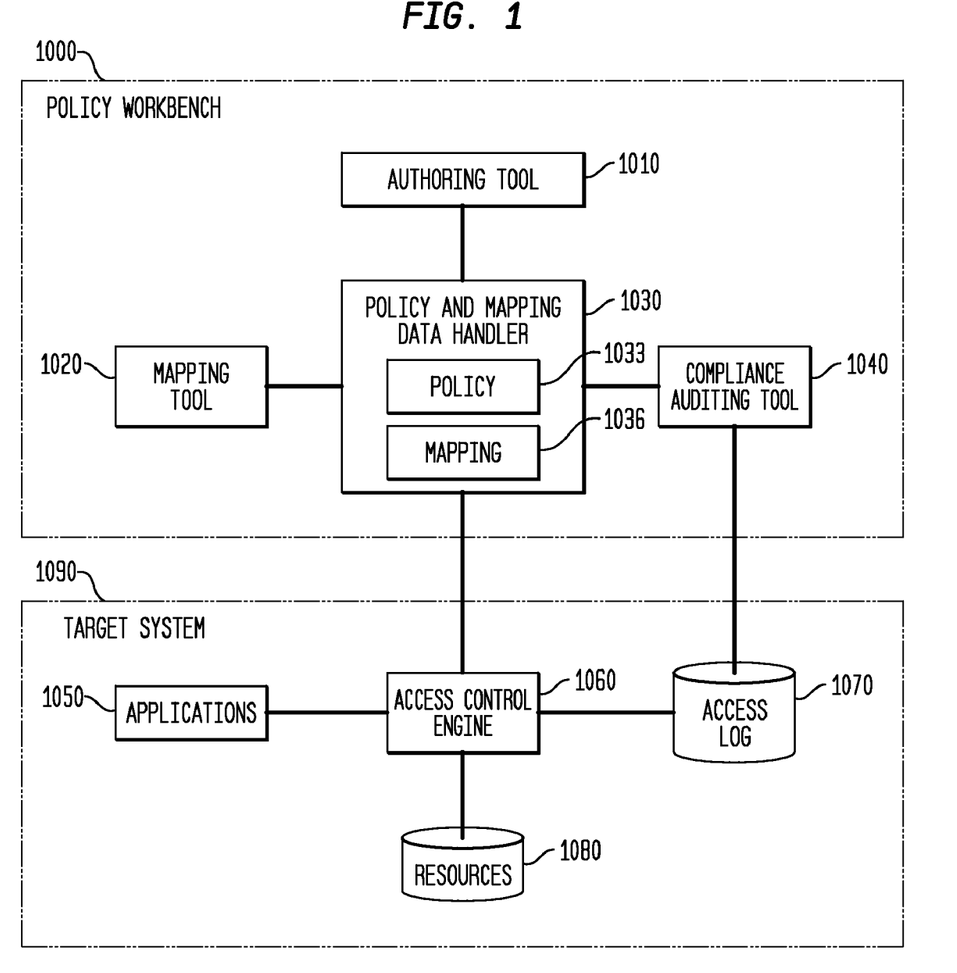
FIG. 1 is an illustrative block diagram showing an example of a policy workbench and a target system in one embodiment of the present disclosure.

FIG. 1 is diagram showing an example of a policy workbench and connected target system in one embodiment of the present disclosure. An instance on a policy workbench 1000 interacts with a target system 1090. In one embodiment, the policy workbench 1000 includes an authoring tool 1010, a mapping tool 1020 and a compliance auditing tool 1040, all of which communicate with a policy and mapping data handler 1030. The policy and mapping data handler 1030 in one embodiment manages policy 1033 and mapping 1036 instances. The authoring tool 1010 allows a given user to create and modify a given policy 1033. The mapping tool 1020 allows a user to create a mapping 1036, for an instance of a policy workbench 1000 to map one or more elements from the target system 1090 (e.g., applications 1050, resources 1080, and user ID's) to one or more elements of the policy 1033 (e.g., in the case of privacy policies, types policies or policy definitions may include user categories, data categories, actions, and purposes). The compliance auditing tool 1040 allows users to verify that the target system 1090 activity complies with the policy 1033. Access control events that are recorded in the access log 1070 by the target system's 1090 access control engine 1060 are translated by the compliance auditing tool 1040 using the mapping 1036 for comparison with limits and restrictions indicated by the policy 1033.

A target system 1090 may be any infrastructure that provides access to resources 1080 (e.g. computer files) by applications (e.g., editors, like VI or EMACS) and enforce some policies. In one embodiment, an access control engine 1060 enforces the policies, for example, limitations on the access to the system. An access control engine, for example, may include but is not limited to a UNIX computer file access control system. The access control engine 1060 may be, at least in part, governed by the policy 1033 and mapping 1036 provided by the policy and mapping data handler 1030. The access control engine 1060 in one embodiment records whether given requests were accepted or denied, for instance, in an access log 1070. Examples of an access log 1070 may include but is not limited to a text file or a database such as IBM's DB/2.

Figure 2:
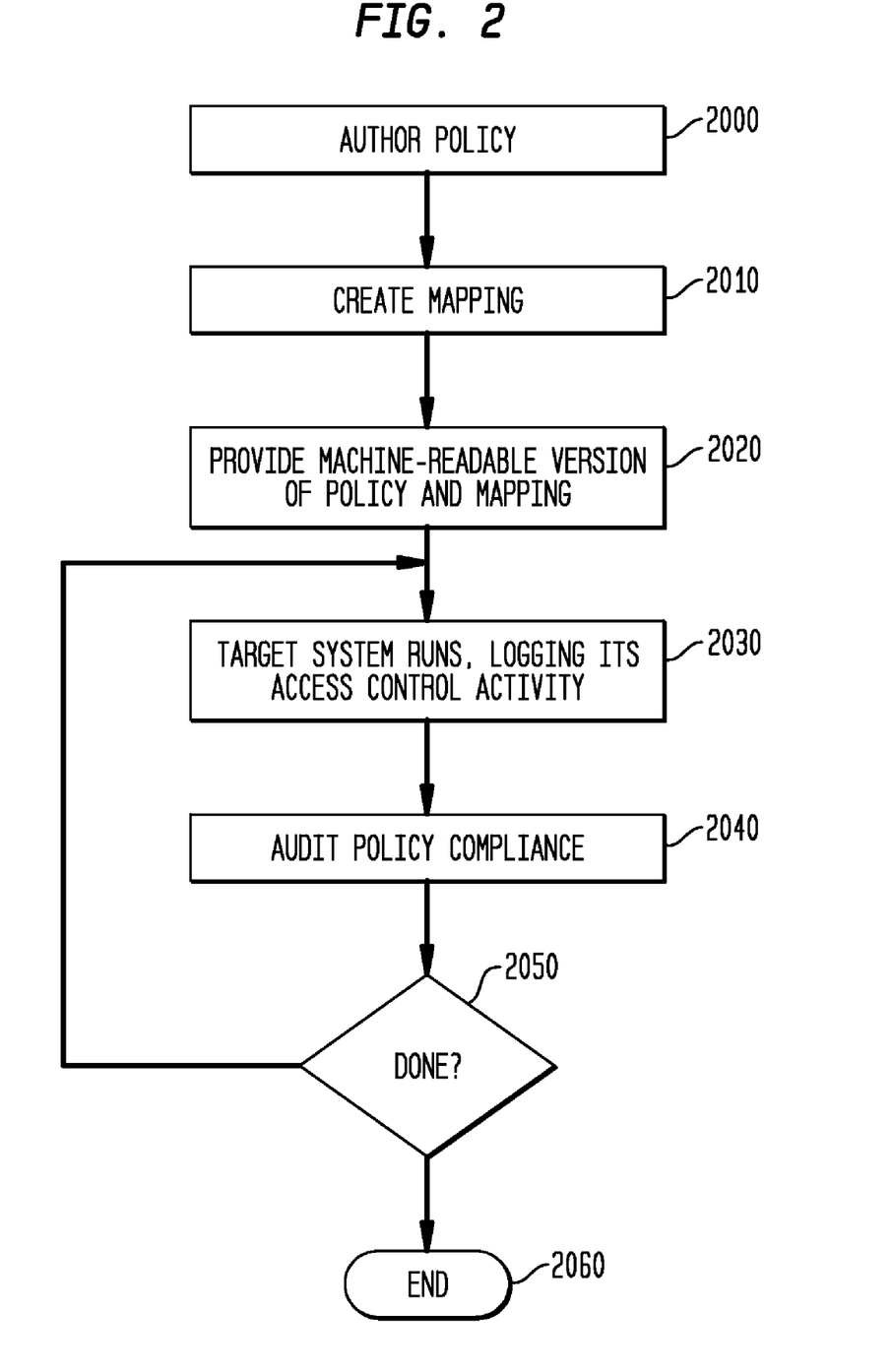
FIG. 2 is a flow diagram illustrating flow control of a policy workbench in one embodiment of the present disclosure.

FIG. 2 illustrates an example of a flow control of a policy workbench. At step 2000, a policy 1033 is created, for instance, using an authoring tool 1010, which stores the policy 1033 in a policy and mapping data handler 1030. At step 2010, for instance, using a mapping tool 1020, a translation or mapping 1036 between elements of the policy 1033 and target system 1090 elements is created and stored, for instance, in a policy and mapping data handler 1030. At step 2020, the policy and mapping data handler 4090 provides a machine-readable form of the policy 1033 and mapping 1036. Although beyond the scope of the current invention, the target system 1090 can then choose to implement the access restrictions specified by the machine-readable form of the policy 1033 and mapping 1036. A person of ordinary skill in the art will appreciate that this implementation could be obtained by first translating the policy 1033 into target system 1090 elements, and then modifying the access control engine 1060 to enforce these restrictions. A person of ordinary skill in the art will also appreciate that an automated mechanism could also be created to obtain the translated policy and execute the associated access control engine 1060 modification. For example, given a policy that indicates that "guards can read all prisoner email for the purpose of security" and a mapping that specifies that George is a guard and Peter is a prisoner, the access control engine 1060 may be modified to allow George to read all of Peter's email, each such access being logged in the access log 1070.

A person of ordinary skill in the art will also appreciate that, rather that modifying the access control engine 1060, the machine-readable forms of the policy 1033 and mapping 1036 may also be used, for example, by a security system administrator, to review the current configuration of the access control engine 1090. The access control engine 1090 may also be modified to overcome any discrepancies that are found.

At step 2030, the target system 1090 runs for some non-zero period of time, during which the access control engine 1060 records its access control decisions in the access log 1070. At step 2040, a compliance auditing tool 1040 retrieves the data recorded in the access log 1070, translates it into the language of the policy 1033 using the mapping 1036, and checks how recorded activity has complied with the policy 1033. This compliance check may be performed at any time including, but not limited to:

periodically, for example, every day, end of month, end of year, etc.

event driven, for example, in response to a customer complaint, in response to modification of the target system 1090, or a suspected system security attack, etc.

as part of batch job, which may happen to include a compliance audit, etc.

when a new mapping or policy are created.

This comparison may include, but is not limited to determining how many events were denied, as well as a breakdown of which events were permitted by the policy 1033. In the case where the policy is composed of one or more rules, this breakdown may include indication of how many events were permitted by each of the rules. If at step 2050, it is determined that execution is finished, then the method completes at step 2060. Otherwise, control continues at step 2030, where the target system 1090 continues to run, recording its access control decisions.

For further details of the operation and function of a policy workbench, see Carolyn Brodie and Jinjuan Feng, "Usable Security and Privacy: A Case Study of Developing Privacy Management Tool," Proceedings of the 2005 Symposium on Usable Privacy and Security, Pittsburgh, Pa., pp. 35-43. That document describes a policy workbench 1000 and its interactions with a given target system.

Figure 3:
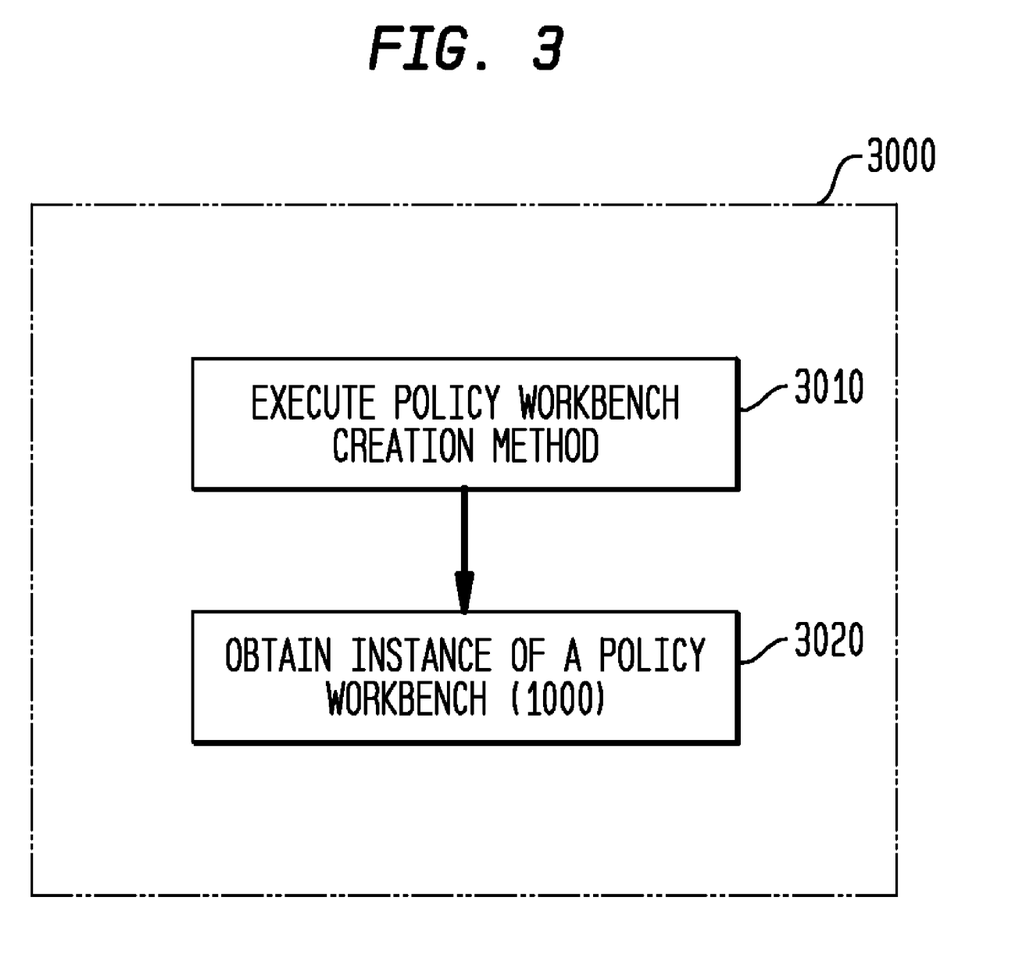
FIG. 3 is a diagram illustrating an overview of policy workbench creation in one embodiment of the present disclosure.

FIG. 3 is a diagram illustrating an overview of policy workbench creation in one embodiment of the present disclosure. At 3010, a creation method is executed. An embodiment of this method is described with reference to FIG. 5. At 3020, executing a creation method results in an instance of a policy workbench 1000. Thus, an embodiment of the present disclosure includes a machine that is able to create a policy workbench 1000.

Figure 4:
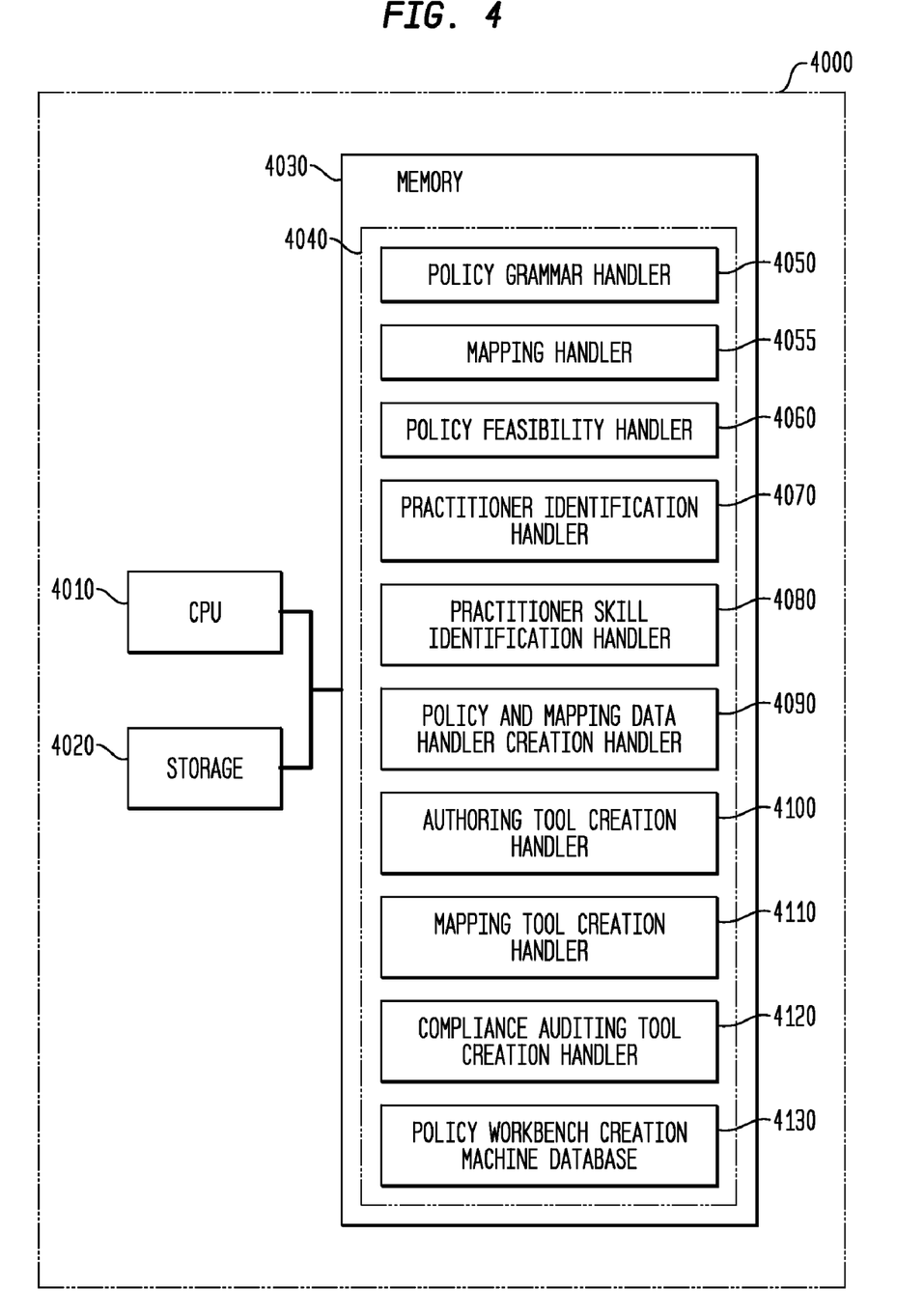
FIG. 4 is a block diagram illustrating a policy workbench creation machine according to one embodiment of the present disclosure.

FIG. 4 shows a block diagram of a computing system used to create a policy workbench machine in one embodiment of the present disclosure. This system 4000 may comprise any computing node that is able to load and execute programmatic code, including, but not limited to: products sold by IBM such as ThinkPad® or PowerPC®, running the operating system and server application suite sold by Microsoft, e.g., Windows® XP, or a Linux operating system. System logic 4040 is preferably embodied as computer executable code that is loaded from a remote source (e.g., from a network file system), local permanent optical (CD-ROM), magnetic storage (such as disk), or storage 4020 into memory 4030 for execution by CPU 4010. As will be discussed in greater detail below, the memory 4030 preferably includes computer readable instructions, data structures, program modules and application interfaces forming the following components:

a policy grammar handler 4050,
    a mapping handler 4055,
    a policy feasibility handler 4060,
    a practitioner identification handler 4070,
    a practitioner skill identification handler 4080,
    a policy and mapping data handler creation handler 4090,
    an authoring tool creation handler 4100,
    a mapping tool creation handler 4110,
    a compliance auditing tool creation handler 4120, and
    a policy workbench creation machine database 4130.

A policy workbench creation machine database 4130 in one embodiment provides for creation, deletion and modification of persistent data, and is used by the handlers 4050-4120 of the creation machine 4000. An example of a product providing such function includes IBM DB/2 database system.

A policy grammar handler 4050 in one embodiment is responsible for determining the rule grammar of a given domain's policy. In an exemplary embodiment, it is assumed that a given policy workbench 1000 deals with a single policy 1033. This policy may include one or more rules using a rule grammar. In the case of the SPARCLE Policy workbench, the rule grammar that was developed for the domain of personal information privacy was as follows:

[User Category] can [Action] [Data Category] for the purpose of [Purpose] if [(optional) Condition(s)] with [(optional) Obligation(s)]
    Where:
        [User Category] indicates those to whom a given rule applies
        [Action] indicates the action a given user can perform
        [Data Category] indicates the data to which a given rule applies
        [Purpose] indicates the given user's reason for performing the given action on the given bit of data
        [(optional) Condition] indicates an optional precondition for the given rule to be applicable
        [(optional) Obligation] indicates an optional post-condition for the given rule to be applicable An example of a rule fitting this grammar is:
    Managers can review work schedules for the purpose of scheduling if the associated employee has not given written orders to the contrary with the schedule being destroyed three years after the employee leaves the firm.
    Where:
        [User Category]=managers
        [Action]=review
        [Data Category]=schedules
        [Purpose]=scheduling
        [(optional) Condition(s)]="the associated employee has not given written orders to the contrary"
        [(optional) Obligation]="the schedule being destroyed three years after the employee leaves the firm"

The policy grammar handler 4050 can also determine commonly used rule vocabulary for given domains. The SPARCLE Policy workbench, for example, provided commonly used privacy policy rule vocabulary for personal privacy policies. One such set specialized the privacy policies of medical organizations. An example of commonly used rule vocabulary may include, but is not limited to:

User Category Terms: doctors, nurses, billing reps, customer service reps, management, marketing reps, patients, and pharmacists.
    Action Terms: collect, modify, and use
    Data Category Terms: credit card number, customer mailing address, customer name, date of birth, and email
    Purpose Terms: confirm identity, notification, order processing, respond to inquiry, send marketing information, and ship order.

A person of ordinary skill in the art will appreciate that the rule vocabularies are lists of frequently used terms. Users of a given policy workbench 1000 can use other words as well, for example, using "surgeons" as a user category when specifying a medical personal privacy policy rule.

A person of ordinary skill in the art will appreciate that the system and method of the present disclosure may also include cases where there are multiple policies, rule vocabularies, or rule grammars, since either the multiple instances of the above can be combined into a single policy, which includes all of the multiple policies, a single rule vocabulary, which includes all of the multiple rule vocabularies and a single grammar, which include all of the multiple grammars. Alternatively, each of the policies, rule vocabularies or rule grammars could be handled by a separate policy workbench instance 1000.

A policy grammar handler 4050 determines a given policy workbench instance's 1000 rule vocabulary and rule grammar in a plurality of ways. For instance, the handler 4050 takes as input examples of rules for the target domain. These example rules may be in the form of natural language, for example, English sentences expressing policy constraints. The handler 4050 parses these example rules to determine a rule grammar that covers all of them, or the greatest percentage. In the case of the SPARCLE Privacy Policy Workbench, an example of a rule grammar is:

[User Category(ies)] can [Action(s)] [Data Category(ies)] for the purpose(s) of [Purpose(s)] if [(optional) Condition(s)] with [(optional) Obligation(s)]

A person of ordinary skill in the art will appreciate that a user may interactively provide input to the policy grammar handler 4050 to help in the determination of a given domain's rule grammar and rule vocabulary. Once determined, the given rule grammar and rule vocabulary are stored in the policy workbench creation machine database 4130 for use by the other handlers 4060-4120.

Another way a policy grammar handler 4050 can determine the rule grammar is by using the specification of the machine-readable policy encoding that is provided to the policy and mapping data handler creation handler 4090 described below. For example, the SPARCLE Privacy Policy Workbench uses the OASIS XACML standard. This is an XML-based encoding format that specifies the available rule elements type and their interrelationships. By working back from this standard, the policy grammar handler 4050 is able to determine a privacy policy workbench rule grammar given above.

A mapping handler 4055 in one embodiment is responsible for determining the mapping between the elements of the target system 1090 and a given domain-specific policy. To accomplish this, the handler 4055 in one embodiment is provided with a machine-readable description of its configuration. This description may include the schema of a target system's 1090 security files (e.g., RACF), the schema of its workload control system, or the structure of its user and group lists. Given the list of all types of potential target system 1090 elements, and given the policy rule syntax and vocabulary, the mapping handler 4055 can then create a mapping framework to map from policy 1033 elements to target system 1090 elements.

A policy feasibility handler 4060 in one embodiment determines whether it will be feasible or possible to implement a policy workbench 1000 for the rule grammar and rule vocabulary derived by the policy grammar handler 4050 and retrieved from the policy workbench creation machine database 4130. If, for example, the grammar includes 50 grammar rules, not just a single one like that above, then the policy feasibility handler 4060 may return that a policy workbench for the associated domain is not feasible. The policy feasibility handler 4060 takes as input thresholds for acceptable rule grammars and rule vocabulary, e.g., the maximum number of grammar rules, the maximum grammar rule length, etc.

A practitioner identification handler 4070 determines who the likely users of the policy workbench 1000 instance being produced will be. The handler is first fed the responses to a questionnaire that is sent to a significantly large sized group of members of the target system's 1090 organization. The questions determine who in the target system's 1090 organization is most likely to understand the organization policy issues. There are also questions to determine social network focal points, i.e., users to whom or through whom many others interact. The questionnaire responses are then analyzed, to determine a smaller group of the target organization's policy practitioners. Like the policy grammar handler 4050, a person of ordinary skill in the art will appreciate that a user may interactively provide input to the practitioner identification handler 4070 to help in the handler's 4070 determination, here of the relevant set of practitioners. In one embodiment, the handler stores the identifiers (ids) of the practitioners in the policy workbench creation machine database 4130.

A practitioner skill identification handler 4080 in one embodiment determines the types of interface skill of the practitioners. For instance, the members of the practitioners derived by the practitioner identification handler 4070 are interviewed to determine how policy rules are created in the target organization. Do they use natural language? Do they use a structured form-based interface? Do they employ both methods? The results of these interviews are fed to the practitioner skill identification handler 4080. The handler summarizes the results and stores its findings in the policy workbench creation machine database 4130. These results, for example, are used by the authoring tool creation handler 4100 to create a domain specific authoring tool 1010.

A policy and mapping data handler creation handler 4090 in one embodiment is responsible for creating a policy workbench 1000 instance's policy and mapping data handler 1030. This handler 1030 in one embodiment is able to store the policy 1033, store a mapping 1036 and provide a machine-readable encoding of the policy 1033 and mapping 1036.

Given the policy rule grammar and vocabulary determined by a policy grammar handler 4050, a policy and mapping data handler creation handler 4090 can compute and build the storage code required to store a given policy 1033. Given the mapping framework determined by the mapping handler 4055, a policy and mapping data handler creation handler 4090 can compute and build the storage code required to store a given mapping 1036. In one embodiment, this handler is provided with as input an encoding algorithm that provides a machine-readable encodings of both a policy 1033 and a mapping 1035, for example, XML-based ones. In the case of the SPARCLE Privacy Policy Workbench, this encoding algorithm is the XML-based Oasis XACML standard. Given the encoding algorithms this handler 4090 can compute and build the code required to provide a machine-readable encodings of a given policy 1033 and mapping 1036. Combining these pieces of code, this handler 4090 is able to provide an instance of a domain-specific policy and mapping data handler 1030.

An authoring tool creation handler 4100 in one embodiment is responsible for creating an instance of an authoring tool 1010. For example, using the policy rule grammars and vocabulary determined by the policy grammar handler 4050, and the practitioner skills determined by the practitioner skill identification hander 4080, this handler 4100 is able to compute and build an instance of an authoring tool 1010, which will allow one of the practitioners author a domain-specific policy 1033. An authoring tool 1010 instance stores any such policy 1033 in the policy and mapping data handler 1030 instance created by the policy and mapping data handler creation handler 4090.

A mapping tool creation handler 4110 is responsible for creating an instance of a mapping tool 1020. Using the mapping framework determined by the mapping handler 4055, this handler 4110 is able to compute and build an instance of a mapping tool 1020, which will let one of the practitioners map the elements of a domain-specific policy to the target system's 1090 elements. A mapping tool 1020 instance stores any such mapping 1036 in the policy and mapping data handler 1030 instance created by the policy and mapping data handler creation handler 4090.

A compliance auditing tool creation handler 4120 in one embodiment is responsible for creating an instance of a compliance auditing tool 1040. Using the policy rule grammars and vocabulary determined by the policy grammar handler 4050, and the mapping framework determined by the mapping handler 4055, this handler 4120 is able to compute and build an instance of a compliance auditing tool 1040, which will let one of the practitioners audit how the activity recorded in the target system's 1090 access log 1070 complies with the policy 1033, the events translated using the mapping 1036, where both the policy 1033 and mapping 1036 are stored in the policy and mapping data handler 1030 instance created by the policy and mapping data handler creation handler 4090.

Figure 5:
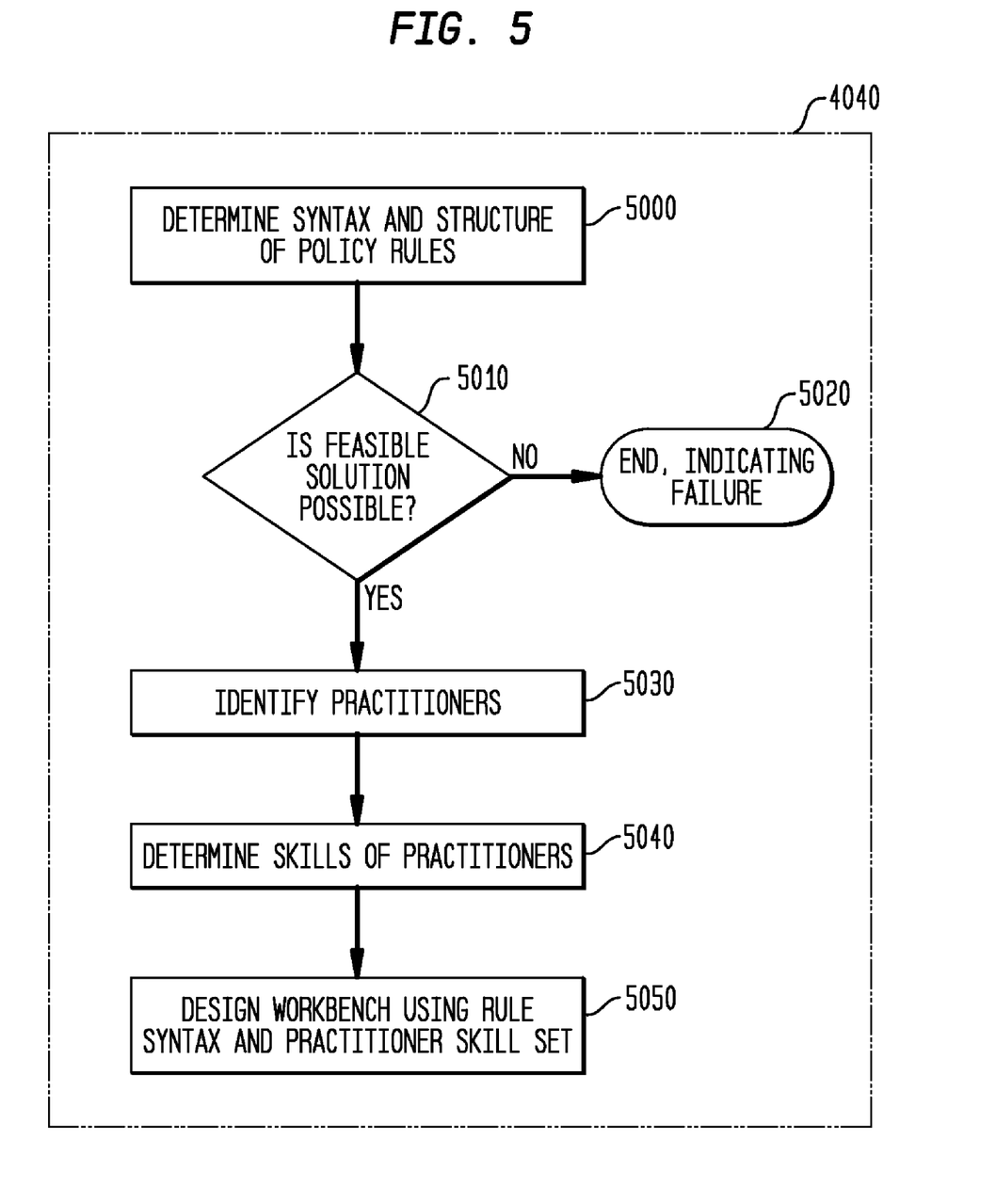
FIG. 5 is a flow diagram illustrating a policy workbench creation method in one embodiment of the present disclosure.

FIG. 5 is a flow diagram illustrating a policy workbench creation method in one embodiment of the present disclosure. At step 5000, the policy grammar handler 4050 is invoked to determine the syntax and structure of the given domain's policy. At step 5010, the policy feasibility handler 4060 is invoked to determine whether creation of a policy for the given domain is practicable. If not, machine 4000 exits indicating failure at step 5020. Otherwise, at step 5030, the practitioner identification handler 4070 is called to determine the relevant practitioners. At step 5040, the practitioner skill identification handler 4080 is called to determine the skills of these practitioners. At step 5050, an instance of a policy workbench for the given domain is created through invocations of the policy and mapping data handler creation handler 4090, the authoring tool creation handler 4100, the mapping tool creation handler 4110, and the compliance auditing tool creation handler 4120 respectively.

A skilled artisan will appreciate that a given service organization could use the system and method of the present disclosure to provide policy workbench related services for a first user. These policy workbench related services comprise: the service organization creating all or part of a policy workbench instance for the first user; the service organization updating all or part of the first user's policy workbench instance; the service organization validating (e.g., checking the correctness and completeness) all or part of the first user's policy workbench instance; the service organization analyzing of all or part of the first user's policy workbench instance; the service organization teaching the first user to create all or part of a policy workbench instance for themselves; the service organization teaching the first user to update all or part of a policy workbench instance for themselves; the service organization teaching the first user to validate all or part of a policy workbench instance for themselves; and the service organization teaching the first user to analyze all or part of a policy workbench instance for themselves. A skilled artisan will further appreciate that the service organization could charge the customer organization for the provision of any of the services specified above.

It is to be understood that the provided illustrative examples are by no means exhaustive of the many possible uses for the invention. The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for creating a policy workbench for a given domain, comprising:
    analyzing a domain; and
    generating automatically by a processor, a domain-specific policy workbench instance specific to the analyzed domain, the domain-specific policy workbench instance including at least an authoring tool that allows a user to create and modify a given policy, a mapping tool that allows a user to create a mapping for the domain-specific policy workbench instance to map one or more elements from a target system to one or more elements of the given policy, and a compliance auditing tool that allows a user to verify that a target system activity complies with the given policy, the generating including at least:
    determining syntax and structure of one or more policies in the analyzed domain;
    creating a mapping framework that maps elements of the one or more policies to elements of the domain;
    building, by a processor, using the determined syntax and structure of one or more policies in the analyzed domains a code to store a given policy and a code to provide a machine-readable encodings of the given policy and mapping based on the mapping framework; and
    creating, by a processor, an authoring tool for authoring a domain-specific policy using at least the determined syntax and structure.

2. The method of claim 1, wherein the step of determining syntax uses an encoding format as a basis.

3. The method of claim 1, wherein the step of providing a domain-specific policy workbench includes:
    creating a natural language grammar based on the syntax.

4. The method of claim 1, wherein the domain specific policy workbench provides an encoded rendering of a given policy.

5. The method of claim 4, wherein the encoding is XML-based.

6. The method of claim 5, wherein the XML-based encoding uses the OASIS XACML standard.

7. The method of claim 1, wherein the domain includes security, autonomic computing, workload management, or systems management, or combination thereof.

8. The method of claim 1, further including:
    obtaining one or more system activity events from a log of the domain;
    using the one or more mappings to translate the one or more system activity events into policy language; and
    comparing translated events to policy rules.

9. The method of claim 1, further including:
    determining whether creating a policy for the domain is feasible based on whether the determined rule vocabulary and rule grammar meet one or more input thresholds.

10. The method of claim 1, further including:
    creating a compliance auditing tool operable to allow a practitioner to audit compliance of system activities according to the given policy and mapping provided by the code.

11. The method of claim 1, further including at least:
    invoking a practitioner identification handler to identify one or more practitioners; and
    invoking a practitioner skill identification handler to determine skills of the one or more practitioners,
    wherein the identified one or more practitioners and the skills are used to create the authoring tool specific to the domain.

12. A system for creating a domain-specific policy workbench, comprising:
    a processor;
    a policy grammar handler for determining syntax, including rule vocabulary and rule grammar of a policy in a selected domain;
    a mapping handler for creating a mapping framework to map policy elements to domain elements;
    a policy and mapping data handler creation handler for creating a policy and mapping data handler that creates a policy workbench instance specific to the selected domain including at least a machine-readable encodings of the selected policy and associated mapping based on the mapping framework; and
    a compliance auditing tool creation handler for creating a compliance auditing tool that allows a practitioner to audit compliance of system activities according to the selected policy and the associated mapping,
    an authoring tool creation handler for creating an instance of an authoring tool for authoring a domain-specific policy using at least the determined rule vocabulary and rule grammar,
    wherein the created domain-specific policy workbench includes at least the authoring tool that allows a user to create and modify a given policy, a mapping tool that allows a user to create a mapping for the domain-specific policy workbench instance to map one or more elements from a target system to one or more elements of the given policy, and the compliance auditing tool that allows a user to verify that a target system activity complies with the given policy.

13. The system of claim 12, further including at least:

a practitioner identification handler operable to identify one or more practitioners; and a practitioner skill identification handler operable to determine skills of the one or more practitioners, wherein the authoring tool creation handler further uses the determined skills of the one or more practitioners in creating the instance of an authoring tool specific to the selected domain.

14. A program storage device readable by machine, tangibly embodying a program of instructions executable by the machine to perform a method of creating a domain-specific policy workbench, comprising:

determining syntax of a policy in a selected domain;

creating an instance of policy workbench specific to the selected domain, the creating including at least:

determining syntax and structure, including rule vocabulary and rule grammar of one or more policies in the analyzed domain;

creating a mapping framework that maps elements of the one or more policies to elements of the domain;

building, by a processor, using the determined syntax and structure of one or more policies in the analyzed domain a code to store a given policy and a code to provide a machine-readable encodings of the given policy and mapping based on the mapping framework; and creating, by a processor, an instance of an authoring tool, using at least the determined rule vocabulary and rule grammar, for authoring a domain-specific policy, wherein the created policy workbench specific to the selected domain includes at least the authoring tool that allows a user to create and modify a given policy, a mapping tool that allows a user to create a mapping for the domain-specific policy workbench instance to map one or more elements from a target system to one or more elements of the given policy, and a compliance auditing tool that allows a user to verify that a target system activity complies with the given policy.

15. The program storage device of claim 14, wherein the step of creating further includes at least:

invoking a compliance auditing tool creation handler to create a compliance auditing tool that allows a practitioner to audit compliance of system activities according to the given policy and mapping.

\* \* \* \* \*